(12) United States Patent
Weimer

(10) Patent No.: US 7,918,172 B2
(45) Date of Patent: Apr. 5, 2011

(54) METHOD FOR PRODUCTION OF A THREE-DIMENSIONAL CURVED FIBER COMPOSITE MATERIAL STRUCTURAL COMPONENT

(75) Inventor: Christian Weimer, Munich (DE)

(73) Assignee: Eurocopter Deutschland GmbH, Donauworth (DE)

( * ) Notice: Subject to any disclaimer, the term of this patent is extended or adjusted under 35 U.S.C. 154(b) by 554 days.

(21) Appl. No.: 11/996,385

(22) PCT Filed: Jul. 15, 2006

(86) PCT No.: PCT/DE2006/001229
§ 371 (c)(1),
(2), (4) Date: Jul. 28, 2008

(87) PCT Pub. No.: WO2007/009440
PCT Pub. Date: Jan. 25, 2007

(65) Prior Publication Data
US 2008/0295755 A1 Dec. 4, 2008

(30) Foreign Application Priority Data

Jul. 19, 2005  (DE) .................. 10 2005 033 498
Jul. 6, 2006   (DE) .................. 10 2006 031 491

(51) Int. Cl.
D05B 35/06  (2006.01)
D04H 1/74   (2006.01)
B32B 37/14  (2006.01)

(52) U.S. Cl. ................. 112/475.08; 428/102; 442/51

(58) Field of Classification Search ............ 112/417, 112/429, 152, 307, 308, 475.08; 156/93, 156/303.1, 181; 428/102, 113, 221, 902; 442/27, 51, 327, 367
See application file for complete search history.

(56) References Cited

U.S. PATENT DOCUMENTS

| 4,410,577 | A |   | 10/1983 | Palmer et al. |
| 4,495,231 | A | * | 1/1985  | Laskaris et al. ............. 428/36.1 |
| 4,512,835 | A | * | 4/1985  | Gardiner ....................... 156/174 |
| 4,737,399 | A |   | 4/1988  | Cole |
| 4,786,541 | A |   | 11/1988 | Nishimura et al. |

(Continued)

FOREIGN PATENT DOCUMENTS

| EP | 0056352 | 7/1982 |
| EP | 0073648 | 3/1983 |
| WO | 0242044 | 5/2002 |

*Primary Examiner* — Ismael Izaguirre
(74) *Attorney, Agent, or Firm* — Brooks Kushman P.C.

(57) ABSTRACT

A method for producing a three-dimensionally curved fiber composite material component having a predefined flexural member profile cross section with at least one web area and at least one adjacent flange area, includes providing a flat base fiber laid scrim and disposing a unidirectional fiber laid scrim tape with 0 degree fibers on a partial area of the fiber laid scrim and fixed by sewing so as to provide a flat prefabricated fiber laid scrim strip having a flange area including the unidirectional fiber laid scrim tape and a web strip area free of the fiber laid scrim. The prefabricated scrim tape is draped to a desired contour and is sewn onto a support material so as to provide a stabilized three-dimensionally curved first sub-fiber laid scrim preform adapted to the fiber composite material structural component to be produced.

10 Claims, 1 Drawing Sheet

U.S. PATENT DOCUMENTS

| | | | |
|---|---|---|---|
| 5,308,228 A * | 5/1994 | Benoit et al. | 416/230 |
| 5,642,679 A * | 7/1997 | Monget et al. | 112/470.13 |
| 6,096,164 A * | 8/2000 | Benson et al. | 156/425 |
| 6,579,815 B1 * | 6/2003 | Popper et al. | 442/366 |
| 2003/0138602 A1 | 7/2003 | Lorenz et al. | |
| 2004/0079838 A1 | 4/2004 | Simpson et al. | |
| 2005/0084647 A1 * | 4/2005 | Menzies et al. | 428/99 |
| 2009/0229761 A1 * | 9/2009 | Joern et al. | 156/433 |
| 2010/0175817 A1 * | 7/2010 | Scholten et al. | 156/190 |

* cited by examiner

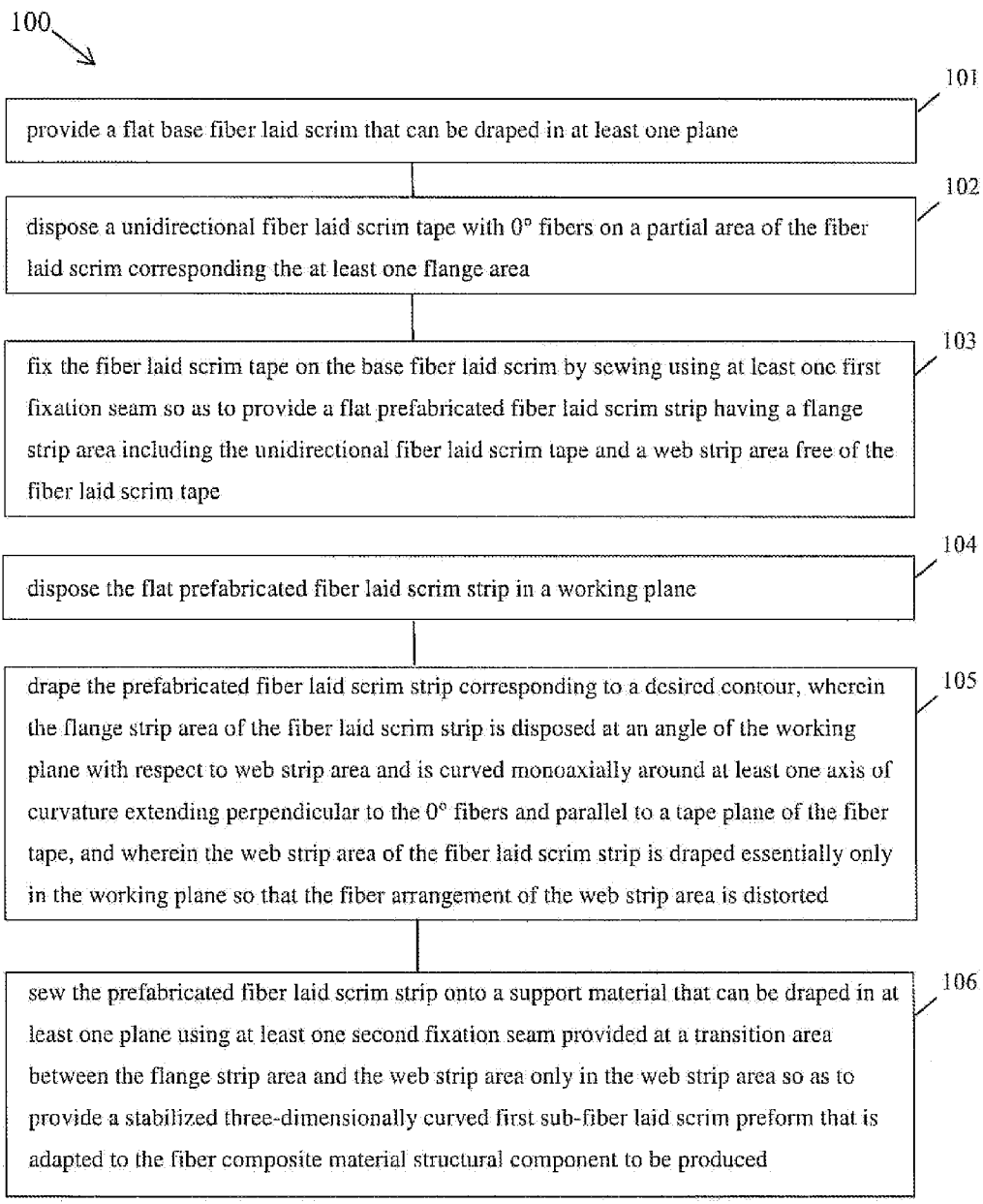
Figure

METHOD FOR PRODUCTION OF A THREE-DIMENSIONAL CURVED FIBER COMPOSITE MATERIAL STRUCTURAL COMPONENT

This application is a U.S. National Phase application under 35 U.S.C. §371 of International Application No. PCT/EP2006/001229, filed Jul. 15, 2006 and claims the benefit of German Patent Application Nos. DE 10 2005 003498, filed on Jul. 19, 2005 and 10 2006 031491, filed Jul. 6, 2005. The International Application was published in German on Jan. 25, 2007 as WO 2007/009440 under PCT Article 21 (2).

The present invention relates to a method for the production of a three-dimensionally curved fiber composite material structural component. Such fiber composite material structural components are used, for example, as spars or formers, that is to say, as load-bearing components of an aircraft wing. The beam-shaped spar has the function of absorbing the lateral forces and flexural moments stemming from the aerodynamic and inertial forces. Spars are also used, for example, in rotor blades, for example, of wind turbines and helicopters. Moreover, spars, spars formers consisting of fiber composite material structural components, are also used in the tail assemblies of aircraft.

BACKGROUND

As a rule, such spars consist of essentially two components that fulfill different functions. The so-called flanges absorb the normal forces from the flexural moments. The shear web that joins the flanges absorbs the lateral forces and conducts the shear between the flanges.

In the case of aircraft with a plastic construction, in which the spars are made of a fiber composite material, the flanges are made of a unidirectional layer (abbreviated UD layer). The shear web consists of a woven fabric or of a laid scrim at, for example, 45°, e.g. the so-called Balanced Ply Laminate 45. Unidirectional layer is the designation for a layer of a fiber composite in which all of the fibers are oriented in one single direction and it is thus also referred to as a 0° fiber laid scrim, that is to say, the fibers are aligned in the lengthwise direction of the tape. Here, the fibers are assumed to be ideally parallel and distributed homogeneously. The unidirectional layer is transversally isotropic.

All fiber prepregs, for example, fabrics, nonwovens, multiaxial laid scrims, used in fiber composites can be structured from unidirectional layers.

A woven fabric is a crosswise composite structure that is made up of two unidirectional layers that are positioned at an angle of 90° with respect to each other.

In wing spars as fiber composite material structural components, it is a known procedure to use the unidirectional layer as a flange that absorbs the normal forces from the flexural moments. In addition to the unidirectional laid scrim for the flanges, the fiber composite material structural component comprises the shear web that is made of a woven fabric or of a laid scrim, whereby in the case of a woven fabric, an undulation of the fibers is created by the weaving and this can lead to a lowering of the fiber-parallel compressive strength. In a laid scrim, which is held together by paper or vane stitching, the fibers ideally lie parallel and stretched.

In order to produce a preform with the three-dimensional shape of a curved fiber composite material structural component—on the basis of available prepregs, i.e. dry or optionally pre-impregnated fibers combined to form certain laid scrims—it is a known approach to use sewing techniques to produce individual preform parts with their final shape, i.e. three-dimensional individual preform parts that are dimensionally stable in three-dimensional space. These individual preform parts are sewed to form three-dimensional preforms. The sewing procedure here is three-dimensional.

As an alternative, so-called binder preforming is used with which, however, the placement of unidirectional tapes into the flanges is difficult.

SUMMARY OF THE INVENTION

An object of the present invention is to provide a method for the production of a three-dimensionally curved fiber composite material structural component, for example, a former or spar in airplane or helicopter construction, which—with little production effort—makes it possible to bring the unidirectional fibers and the fiber laid scrim into a three-dimensional shape in which the desired fiber orientation in the individual areas is ensured.

An aspect of the invention is that—by changing the sewing order, that is to say, by systematically sewing base fiber laid scrims that are adapted to the forces that have to be absorbed by the individual areas of the fiber composite material structural component—first of all, a prefabricated fiber laid scrim strip having fiber laid scrim partial areas of a different orientation is produced in a flat manner, including unidirectional fiber strips and having, for example, fiber orientations in a range from ±45° to ±60°. This prefabricated fiber laid scrim strip is then draped three-dimensionally as a function of the desired contour of the fiber composite material structural component to be produced, so that part of the prefabricated fiber laid scrim strip is angled out of the working plane with respect to another area of the fiber laid scrim strip, preferably curved monoaxially around an axis of curvature that extends preferably perpendicular to the unidirectional fibers and parallel to the tape plane of the unidirectional fibers. In this three-dimensionally draped form, the prefabricated fiber laid scrim strip is sewed onto a support material in order to create a stabilized first sub-fiber laid scrim preform.

In airplane construction, when it comes to creating fiber composite material structural components, for example, fiber composite material structural components that form spars, it is especially preferred if the base fiber laid scrim has a fiber orientation in the range from ±30° to ±65°, preferably in the range from ±45° to ±60°, and especially preferably ±45°.

According to an especially preferred embodiment, the prefabricated fiber laid scrim strip is draped in such a way that the unidirectional 0° fiber laid scrim tape-in the sub-fiber laid scrim preform constitutes part of a flange element of a later flexural member cross section of the fiber composite material structural component that is to be produced.

Preferably, 0° fiber laid scrim tape is taken here for the production and draping of the prefabricated fiber laid scrim strip, that is to say, this area is placed flat in the first sewing step, and placed so as to correspond to the desired shape in the step in which it is sewed onto a support. The base fiber laid scrim whose fibers have a different orientation is distorted correspondingly, preferably in the plane, so that it follows the shape prescribed by the unidirectional tape.

According to an especially preferred embodiment, particularly for configuring a C-spar as the fiber composite material structural component, steps a) through f) are carried out a second time, namely, in order to form at least a second sub-fiber laid scrim preform, whereby the first as well as the second sub-fiber laid scrim preform are essentially L-shaped. The second sub-fiber laid scrim preform is inserted as a second layer into the first sub-fiber laid scrim preform so as to nest with it and these are then joined together by sewing.

Here, the sub-fiber laid scrim preforms are preferably inserted into each other so as to nest in that a sub-fiber laid scrim preform is draped so as to overlap with a base strip whose width is reduced in comparison to the other base strip of the other sub-fiber laid scrim preform and is joined by sewing and, hence, the individual base strips preferably overlap at least in areas.

In another step, the sub-fiber laid scrim preforms are preferably impregnated together—that is to say, when they have been joined to the fiber laid scrim preform—with a curable resin and the resin is cured.

According to a preferred embodiment, the support material can be removed before the impregnation with resin. As an alternative, the support material can likewise be impregnated with resin.

BRIEF DESCRIPTION OF THE DRAWINGS

The invention is described in detail below with reference to the drawings, in which:

The FIGURE shows a schematic flow diagram of illustrating one embodiment of the method according to the present invention.

DETAILED DESCRIPTION

The FIGURE shows a schematic flow diagram of a method 100 for producing a three-dimensionally curved fiber composite material structural component having a predefined flexural member profile cross section with at least one web area and at least one adjacent flange area. In block 101 a flat base fiber laid scrim that can be draped in at least one plane is provided. In block 102, a unidirectional fiber laid scrim tape with 0° fibers is disposed on a partial area of the fiber laid scrim which lies in the at least one flange area of the fiber composite material structural component to be produced. In block 103, the fiber laid scrim tape is fixed on the base fiber laid scrim by sewing using at least one first fixation seam to create a flat prefabricated fiber laid scrim strip that has a flange strip area containing the unidirectional fiber laid scrim tape and a web strip area that is free of the unidirectional fiber laid scrim tape. In block 104, the flat prefabricated fiber laid scrim strip is disposed in a working plane. In block 105 the prefabricated fiber laid scrim strip is draped according to a desired contour, wherein the flange strip area of the fiber laid scrim strip is disposed at an angle of the working plane with respect to web strip area and is curved monoaxially around at least one axis of curvature extending perpendicular to the 0° fibers and parallel to a tape plane of the fiber tape, and wherein the web strip area of the fiber laid scrim strip is draped essentially only in the working plane so that the fiber arrangement of the web strip area is distorted. In block 106, the prefabricated fiber laid scrim strip is sewed onto a support material that can be draped in at least one plane using at least one second fixation seam provided at a transition area between the flange strip area and the web strip area only in the web strip area so as to provide a stabilized three-dimensionally curved first sub-fiber laid scrim preform that is adapted to the fiber composite material structural component to be produced.

During the procedure of sewing the prefabricated fiber laid scrim strip onto a support material in order to produce a three-dimensionally curved fiber laid scrim preform, preferably the prefabricated fiber laid scrim strip, which corresponds to the web strip area, is subjected to an advancing movement and simultaneous rotation, so that, during the sewing procedure, a distortion of the fiber arrangement is achieved, thus obtaining the three-dimensional spatial shape as well as the desired curvature. For this purpose, the sewing procedure can preferably be assisted by using a template in a plane. In the template, the seam lines are drawn that lead to a distortion of the multi-directional laid scrim that, together with the unidirectional laid scrim, forms, for example, the web.

Below, the production of a fiber composite material structural component with a fiber laid scrim preform according to the invention will be described with reference to the example of a C-spar.

Here, the flange areas of the C-spar are to be made of a unidirectional tape (with so-called 0° fibers), while the web area is made of a base fiber laid scrim or optionally of a woven fabric that can be draped in a plane. The base fiber laid scrim is preferably a ±45° fiber laid scrim, that is to say, a tape material whose fibers run at an angle of +45° or −45° relative to the tape lengthwise direction. Other base fiber laid scrims with other fiber orientations can be used.

After the base fiber laid scrim and the unidirectional tape have been cut, the unidirectional tape is positioned on or against the base fiber laid scrim. In this process, the unidirectional fiber laid scrim tape is not necessarily laid on or against the entire base fiber laid scrim but rather it can also extend above only a partial area of this base fiber laid scrim. On the other hand, the unidirectional fiber laid scrim tape can also extend over the entire length of the base fiber laid scrim.

Subsequently, the unidirectional fiber laid scrim tape is fixed onto the base fiber laid scrim. This is done over a flat surface, i.e. in a plane without a need for molded parts to orient the unidirectional fiber laid scrim tape and the base fiber laid scrim three-dimensionally with respect to each other. For example, the fiber laid scrim tape can be fixed to the base fiber laid scrim using fixation seams that run crosswise to the fiber direction of the unidirectional fiber laid scrim tape. This gives rise to a flat, prefabricated fiber laid scrim strip that has a flange strip area containing the unidirectional fiber laid scrim tape and a web strip area that is free of the unidirectional fiber laid scrim tape which, in the example, has the ±45° fiber orientation. This combination of fiber laid scrim tape with 0° fibers and fiber laid scrim tape with a fiber orientation adapted to the loads that are anticipated later on is provided in the working plane, for example, the sewing table. For this sewing procedure as well, a template on the table or an automatic control in the plane can prescribe the position of the seams. The tape parts do not have to be distorted in this context.

Subsequently, the arrangement with a 0° and ±45° fiber orientation content is draped corresponding to the contour of the spar or former and sewed onto a support material that is sufficiently dimensionally stable. Preferably, the unidirectional tape is angled out of the working plane around an axis that is essentially perpendicular to the fiber direction of the unidirectional tape in such a way that the flanges of the spar (opposite legs of the C-spars) are formed by the unidirectional tape. In contrast, the web strip area, which is made up of the base fiber laid scrim strip, remains in the working plane, whereby, however, due to the three-dimensional draping of the flange area (without distorting the latter), the fiber arrangement of the base fiber laid scrim is distorted with an orientation in the plane that is not unidirectional. For this purpose, during the draping procedure and the subsequent sewing procedure to a support material, preferably an advancing movement and simultaneous rotation are provided which leads to a distortion of the unidirectional fiber material relative to the base fiber laid scrim strip. This sewing procedure can also be automated or can use flat templates.

This L-shaped draped fiber laid scrim strip is draped on a dimensionally stable support material and stabilized by means of a second fixation seam so that a three-dimensionally curved, first sub-fiber laid scrim preform is created that is adapted to the fiber composite material structural component to be produced, namely, the spar, said preform especially being created in an L-shape consisting of a flange and at least part of the shear web. During the sewing to the support material, the fixation seam is created at a transition area between the flange strip area and the web strip area only in the web strip area so that the distortion of the web strip area is fixed in terms of its fiber orientation. The support material serves primarily to fix the distortion of the web strip area so that it can also be provided only in this area.

Subsequently, a second sub-fiber laid scrim preform, which is likewise L-shaped and forms a flange and part of the shear web, is produced in the same manner.

The two sub-fiber laid scrim preforms are joined together to form a fiber preform in that their individual web areas are at least partially overlapped and inserted into each other so as to nest. This arrangement is fixed by additional seams. The resulting arrangement is subsequently impregnated with a curable resin, whereby it is dimensionally stable due to the sewing procedure as well as due to the impregnation material, so that the desired shape of the fiber composite material structural component is retained even after the resin has cured. Depending on the stability of the sewed arrangement, the support material can also be removed before the impregnation with resin.

The method according to the invention with the sewing steps in the working plane and the subsequent upright positioning between unidirectional fiber laid scrim tapes and a flat base fiber laid scrim can also be used for other fiber composite material structural components or spars, for example, I-spars or box spars, whereby then the connection between the unidirectional and the multidirectional fiber laid scrims is made accordingly.

During the sewing fixation procedure, preferably the sewing is carried out along a paper plot of the envisaged seam, with the contour being drawn onto said paper plot. In order to guide the unidirectional tape part, the unidirectional tape that is fixed to the web can be guided to the sewing head, so that the draping of the multidirectional laid scrim in the plane takes place automatically.

The invention claimed is:

1. A method for producing a three-dimensionally curved fiber-composite material structural component having a predefined flexural member profile cross section with at least one web area and at least one adjacent flange area, comprising the following steps:
   a) providing a flat base fiber laid scrim that can be draped in at least one plane;
   b) disposing a unidirectional fiber laid scrim tape with 0° fibers on a partial area of the fiber laid scrim corresponding the at least one flange area;
   c) fixing the fiber laid scrim tape on the base fiber laid scrim by sewing using at least one first fixation seam so as to provide a flat prefabricated fiber laid scrim strip having a flange strip area including the unidirectional fiber laid scrim tape and a web strip area free of the fiber laid scrim tape;
   d) disposing the flat prefabricated fiber laid scrim strip in a working plane;
   e) draping the prefabricated fiber laid scrim strip according to a desired contour, wherein the flange strip area of the fiber laid scrim strip is disposed at an angle of the working, plane with respect to web strip area and is curved monoaxially around at least one axis of curvature extending perpendicular to the 0° fibers and parallel to a tape plane of the fiber tape, and wherein the web strip area of the fiber laid scrim strip is draped essentially only in the working plane so that the fiber arrangement of the web strip area is distorted; and
   f) sewing the prefabricated fiber laid scrim strip onto a support material that can be draped in at least one plane using at least one second fixation seam provided at a transition area between the flange strip area and the web strip area only in the web strip area so as to provide a stabilized three-dimensionally curved first sub-fiber laid scrim preform that is adapted to the fiber composite material structural component to be produced.

2. The method as recited in claim 1, wherein the base fiber laid scrim has a fiber orientation in a range from ±30° to ±65°.

3. The method, as recited in claim 2, wherein the base fiber laid scrim has a fiber orientation in a range from ±45° to ±60°.

4. The method as recited in claim 3, wherein the base fiber laid scrim has a fiber orientation of ±45°.

5. The method as recited in claim 1, wherein the draping and fixing in step e) is performed using the 0° fiber laid scrim tape as a reference.

6. The method as recited in claim 1, further comprising repeating steps a) to f) so as to form a second sub-fiber laid scrim preform and subsequently inserting the second sub-fiber laid scrim preform as a second layer into the first sub-fiber laid scrim preform so as to nest with it and joining the first and second sub-fiber laid scrim preforms by sewing.

7. The method as recited in claim 6, wherein the first and second sub-fiber laid scrim preforms, are each L-shaped and the web strip areas of the first and second sub-fiber laid scrim preforms are joined to each other to form a C-shaped fiber preform.

8. The method as recited in claim 1, further comprising impregnating the first sub-fiber laid scrim preform with a curable resin and curing the resin.

9. The method as recited in claim 8, further comprising removing the support material from the first sub-fiber laid scrim preform before performing the impregnating.

10. The method as recited in claim 8, wherein the impregnating is performed so as to impregnate the support material with resin together with the first sub-fiber laid scrim preform.

* * * * *